(12) United States Patent
Onaka et al.

(10) Patent No.: US 10,886,630 B2
(45) Date of Patent: Jan. 5, 2021

(54) ANTENNA MODULE AND COMMUNICATION DEVICE

(71) Applicant: Murata Manufacturing Co., Ltd., Kyoto (JP)

(72) Inventors: Kengo Onaka, Kyoto (JP); Yoshiki Yamada, Kyoto (JP); Keisei Takayama, Kyoto (JP); Hirotsugu Mori, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/744,750

(22) Filed: Jan. 16, 2020

(65) Prior Publication Data

US 2020/0153116 A1 May 14, 2020

Related U.S. Application Data

(63) Continuation of application No. PCT/JP2018/020359, filed on May 28, 2018.

(30) Foreign Application Priority Data

Jul. 18, 2017 (JP) ................................. 2017-138859

(51) Int. Cl.
*H01Q 21/06* (2006.01)
*H04B 1/38* (2015.01)
(Continued)

(52) U.S. Cl.
CPC ......... *H01Q 21/065* (2013.01); *H01Q 1/2283* (2013.01); *H01Q 23/00* (2013.01); *H04B 1/38* (2013.01)

(58) Field of Classification Search
CPC .... H01Q 21/065; H01Q 1/2283; H01Q 23/00; H04B 1/38
(Continued)

(56) References Cited

U.S. PATENT DOCUMENTS

| 6,147,648 A | 11/2000 | Granholm et al. |
| 2013/0187830 A1* | 7/2013 | Warnick ............... H01Q 9/0428 343/893 |
| 2017/0194703 A1 | 7/2017 | Watson |

FOREIGN PATENT DOCUMENTS

| JP | H06-291547 A | 10/1994 |
| JP | 2000-508144 A | 6/2000 |

(Continued)

OTHER PUBLICATIONS

Translation of JP 06-291547 cited in the IDS. (Year: 1994).*
(Continued)

*Primary Examiner* — Lee Nguyen
(74) *Attorney, Agent, or Firm* — Pearne & Gordon LLP

(57) ABSTRACT

An antenna module (1) includes an antenna array (100) that includes a plurality of radiation conductors (11) arranged at regular intervals in or on a dielectric substrate (14) and an RFIC (20) that is provided in or on the dielectric substrate (14) and that performs signal processing on a transmission signal transmitted by the antenna array (100) or a reception signal received by the patch antenna array (100). Each of the plurality of radiation conductors (11) has a transmission feeding point from which the transmission signal is transmitted to the RFIC (20) and a reception feeding point at which the reception signal is received from the RFIC (20).

14 Claims, 10 Drawing Sheets

(51) Int. Cl.
   *H01Q 1/22*   (2006.01)
   *H01Q 23/00*  (2006.01)
(58) Field of Classification Search
   USPC ..................................................... 455/575.7
   See application file for complete search history.

(56) References Cited

FOREIGN PATENT DOCUMENTS

| JP | 2015-164294 A  | 9/2015 |
| WO | 2017/113517 A1 | 7/2017 |

OTHER PUBLICATIONS

International Search Report for International Application No. PCT/JP2018/020359 dated Jul. 24, 2018.
Written Opinion for International Application No. PCT/JP2018/020359 dated Jul. 24, 2018.

* cited by examiner

ANTENNA MODULE AND COMMUNICATION DEVICE

This is a continuation of International Application No. PCT/JP2018/020359 filed on May 28, 2018 which claims priority from Japanese Patent Application No. 2017-138859 filed on Jul. 18, 2017. The contents of these applications are incorporated herein by reference in their entireties.

BACKGROUND OF THE DISCLOSURE

Field of the Disclosure

The present disclosure relates to an antenna module and a communication device, and more particularly to a configuration that includes a patch antenna array.

Description of the Related Art

As a dual-polarized patch antenna array (a two-polarized antenna array), there is disclosed a patch antenna array in which antenna elements that are adjacent to each other form a mirror image (see, for example, Patent Document 1). In other words, in the adjacent antenna elements, two feeding points are set at positions that are line-symmetrical to each other. With this configuration, cross polarization and side lobe can be suppressed.

Patent Document 1: Japanese Unexamined Patent Application Publication (Translation of PCT Application) No. 2000-508144

BRIEF SUMMARY OF THE DISCLOSURE

In the above configuration, however, the polarizations of electric fields that are excited when the same radio-frequency signal is fed to radiation conductors of the adjacent antenna elements are the same as each other, and thus, it is difficult to improve the isolation between the adjacent antenna elements. Thus, in an antenna module that uses such a patch antenna array, for example, as a result of undesirable signals leaking to a radio frequency integrated circuit (RFIC) and so forth that are electrically connected to the patch antenna array, the improvement of the communication quality is hindered.

The present disclosure has been made to solve the above-mentioned problem, and it is an object of the present disclosure to achieve the improvement of the communication quality of an antenna module that includes a patch antenna array and the communication quality of a communication device.

To achieve the above-described object, an antenna module according to an aspect of the present disclosure includes a patch antenna array that includes a plurality of radiation conductors arranged at regular intervals in or on a dielectric substrate and an RF signal processing circuit that is provided in or on the dielectric substrate and that performs signal processing on a transmission signal transmitted by the patch antenna array or a reception signal received by the patch antenna array. Each of the plurality of radiation conductors has a transmission feeding point from which the transmission signal is transmitted to the RF signal processing circuit and a reception feeding point at which the reception signal is received from the RF signal processing circuit. Polarized waves formed by the transmission feeding point of one of the plurality of radiation conductors are different from polarized waves formed by the transmission feeding point of another one of the plurality of radiation conductors that is adjacent to the one radiation conductor, and polarized waves formed by the reception feeding point of the one radiation conductor are different from polarized waves formed by the reception feeding point of the other radiation conductor.

As described above, polarized waves formed by the transmission feeding points in the adjacent radiation conductors are different from each other, so that the isolation between the adjacent radiation conductors at the time of transmission can be improved. Similarly, polarized waves formed by the reception feeding points in the adjacent radiation conductors are different from each other, so that the isolation between the adjacent radiation conductors at the time of reception can be improved. Consequently, the isolation between the adjacent radiation conductors is improved both at the time of transmission and reception, and thus, the improvement of the communication quality of the antenna module that includes the patch antenna array is achieved.

In addition, the antenna module is compatible with two types of polarized waves both at the time of transmission and reception, and thus, the antenna module is useful as an antenna module that has a high communication quality and that is used in full-duplex communication.

In a first radiation conductor that is one of the plurality of radiation conductors, the transmission feeding point may be set at a position where an electric field of polarized waves in a first direction is excited, and the reception feeding point may be set at a position where an electric field of polarized waves in a second direction that is different from the first direction is excited. In a second radiation conductor that is one of the plurality of radiation conductors and that is adjacent to the first radiation conductor, the transmission feeding point may be set at a position where an electric field of polarized waves in the second direction is excited, and the reception feeding point may be set at a position where an electric field of polarized waves in the first direction is excited.

As a result, two types of polarized waves that are formed at the time of transmission and two types of polarized waves that are formed at the time of reception can be matched to each other. Therefore, the antenna module according to the present aspect is useful as an antenna module that has a high communication quality and that is used in communication using the same two types of polarized waves both at the time of transmission and reception.

The plurality of radiation conductors may have substantially the same shape and size. When the dielectric substrate is viewed in plan view, a position of the transmission feeding point in the first radiation conductor and a position of the reception feeding point in the second radiation conductor may substantially match each other, and a position of the reception feeding point in the first radiation conductor and a position of the transmission feeding point in the second radiation conductor may substantially match each other.

As a result, for example, the feeding via holes and so forth that are connected to their respective feeding points in the first radiation conductor can be formed at positions that are the same at those in the second radiation conductor, and thus, a design process can be eliminated in a process of manufacturing the antenna module.

The first radiation conductor and the second radiation conductor may be arranged adjacent to each other in the first direction or the second direction. When the dielectric substrate is viewed in plan view, in the first radiation conductor, the transmission feeding point may be offset from the center of the first radiation conductor in the first direction, and the reception feeding point may be offset from the center in the second direction. When the dielectric substrate is viewed in plan view, in the second radiation conductor, the transmission feeding point may be offset from the center of the second radiation conductor in the second direction, and the reception feeding point may be offset from the center in the first direction.

As a result, in a plane that is perpendicular to the dielectric substrate and parallel to the first direction or in a plane that is perpendicular to the dielectric substrate and parallel to the second direction, a desired beam pattern can be obtained, and the space between the first radiation conductor and the second radiation conductor can be reduced. Therefore, the reduction in the size of the antenna module is achieved.

The first direction and the second direction may be perpendicular to each other.

As a result, in each of the first radiation conductor and the second radiation conductor, the isolation of two types of polarized waves that are formed can be optimized. In other words, in each of the radiation conductors, the isolation between the transmission feeding point and the reception feeding point can be optimized, and thus, the reception band noise generated as a result of a transmission signal leaking to a reception system can be suppressed, so that further improvement of the communication quality is achieved.

The plurality of radiation conductors may include a third radiation conductor and a fourth radiation conductor that are adjacent to the first radiation conductor and the second radiation conductor. The first radiation conductor and the second radiation conductor may be adjacent to each other in one of the first direction and the second direction. The third radiation conductor and the fourth radiation conductor may be adjacent to each other in the one of the first direction and the second direction. The first radiation conductor and the third radiation conductor may be adjacent to each other in another one of the first direction and the second direction. The second radiation conductor and the fourth radiation conductor may be adjacent to each other in the other one of the first direction and the second direction. In the third radiation conductor, the transmission feeding point may be set at a position where an electric field of polarized waves in the second direction is excited, and the reception feeding point may be set at a position where an electric field of polarized waves in the first direction is excited. In the fourth radiation conductor, the transmission feeding point may be set at a position where an electric field of polarized waves in the first direction is excited, and the reception feeding point may be set at a position where an electric field of polarized waves in the second direction is excited.

As a result, both in a plane that is perpendicular to the dielectric substrate and parallel to the first direction and a plane that is perpendicular to the dielectric substrate and parallel to the second direction, a desired beam pattern can be obtained, and the spaces between the first radiation conductor, the second radiation conductor, the third radiation conductor, and the fourth radiation conductor can be reduced. Therefore, the reduction in the size of the antenna module is achieved.

The plurality of radiation conductors may have substantially the same shape and size. When the dielectric substrate is viewed in plan view, in two of the first radiation conductor, the second radiation conductor, the third radiation conductor, and the fourth radiation conductor, the two radiation conductors being adjacent to each other in the first direction or the second direction, a position of the transmission feeding point in one of the two radiation conductors and a position of the reception feeding point in another one of the two radiation conductors may substantially match each other, and a position of the reception feeding point in the one of the two radiation conductors and a position of the transmission feeding point in the other one of the two radiation conductors may substantially match each other.

As a result, for example, in each of the first radiation conductor, the second radiation conductor, the third radiation conductor, and the fourth radiation conductor, the feeding via holes and so forth that are connected to their respective feeding points can be formed at the same positions, and thus, a design process can be eliminated in a process of manufacturing the antenna module.

The plurality of radiation conductors may have substantially the same shape and size. When the dielectric substrate is viewed in plan view, in two of the first radiation conductor, the second radiation conductor, the third radiation conductor, and the fourth radiation conductor, the two radiation conductors being adjacent to each other in a direction that is different from the first direction and the second direction, a position of the transmission feeding point in one of the two radiation conductors and a position of the transmission feeding point in another one of the two radiation conductors may substantially match each other, and a position of the reception feeding point in the one of the two radiation conductors and a position of the reception feeding point in the other one of the two radiation conductors may substantially match each other.

As a result, in the two radiation conductors that are adjacent to each other in the direction different from the first direction and the second direction, the feeding via holes and so forth that are connected to their respective feeding points can be formed at the same positions, and thus, a design process can be eliminated in a process of manufacturing the antenna module.

In the plurality of radiation conductors, a layout of the transmission feeding points and the reception feeding points may be repeated for every two of the radiation conductors in the first direction and the second direction.

As a result, the isolation between adjacent ones of the radiation conductors over the entire antenna array can be improved. Thus, further improvement of the communication quality is achieved, and for example, a design process can be eliminated in a process of manufacturing the antenna module.

The patch antenna array may transmit the transmission signal and receive the reception signal at different timings.

As a result, the antenna module can support a time division duplex (TDD) system.

The patch antenna array may transmit the transmission signal and receive the reception signal simultaneously.

As a result, the antenna module can support a system, such as a polarization division duplex (PDD) system or a frequency division duplex (FDD) system, for simultaneously performing transmission and reception.

The transmission signal and the reception signal may have different frequency bands.

As a result, the antenna module can support the FDD system.

The RF signal processing circuit may be disposed so as to overlap an arrangement region of the patch antenna array when the dielectric substrate is viewed in plan view.

As a result, the reduction in the size of the antenna module is achieved. In addition, a feeding line that connects the RF signal processing circuit and the patch antenna array to each other can be shortened. Thus, the loss due to this feeding line is reduced, and further improvement of the communication quality is achieved.

A communication device according to another aspect of the present disclosure includes any one of the above-described the antenna modules and a baseband signal processing circuit. The RF signal processing circuit performs signal processing of a transmission system that up-converts a signal input from the baseband signal processing circuit and outputs the transmission signal to the patch antenna array and signal processing of a reception system that down-converts the reception signal input from the patch antenna array and outputs the reception signal to the baseband signal processing circuit.

The improvement of the communication quality of such a communication device is also achieved by providing the above-described antenna module in the communication device.

According to the present disclosure, the improvement of the communication quality of an antenna module that includes a patch antenna array and the communication quality of a communication device are achieved.

DETAILED DESCRIPTION OF THE DISCLOSURE

Figure 1:
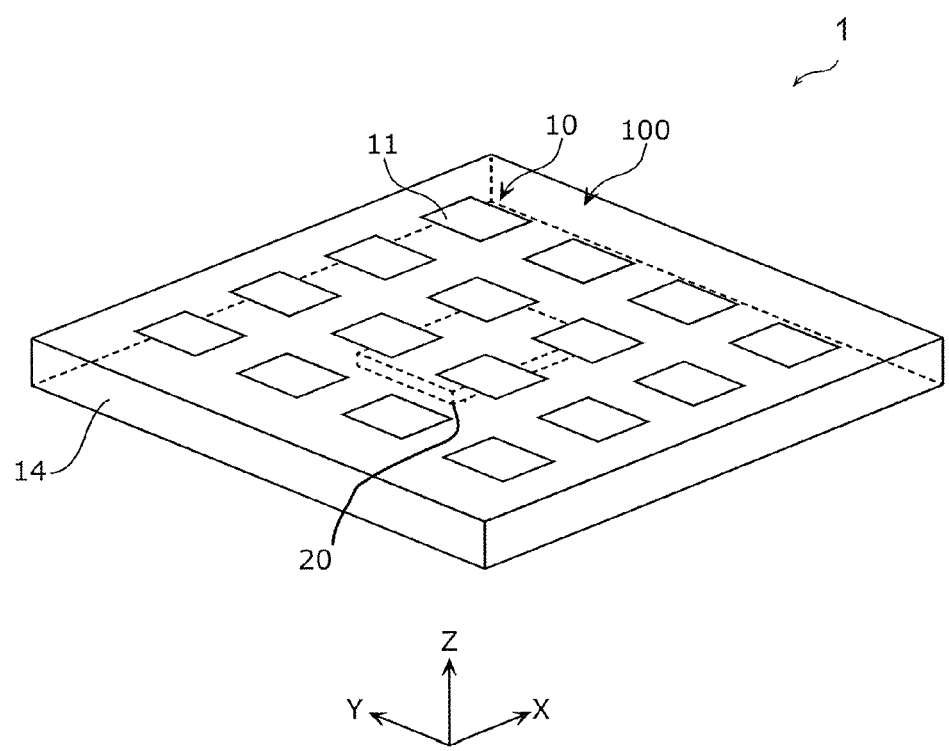
FIG. 1 is an external perspective view of an antenna module according to an embodiment of the present disclosure.

An embodiment of the present disclosure will be described in detail below with reference to the drawings. Note that the embodiment, which will be described below, is a comprehensive or specific example. Numerical values, shapes, materials, components, arrangement positions and connection configurations of the components, and so forth that are described in the following embodiment are examples and are not intended to limit the scope of the present disclosure. Among the components in the following embodiment, the components that are not mentioned in the independent claims will be described as arbitrary components. In addition, the sizes of the components illustrated in the drawings or the ratio of their sizes are not necessarily exact. In the drawings, components that have substantially the same configuration are denoted by the same reference signs, and repeated descriptions may sometimes be omitted or simplified.

Embodiment

[1. Configuration of Antenna Module]

FIG. 1 is an external perspective view of an antenna module 1 according to an embodiment of the present disclosure.

In the following description, a thickness direction of the antenna module 1 will be referred to as the Z-axis direction, and directions that are perpendicular to the Z-axis direction and that are perpendicular to each other will be referred to as the X-axis direction and the Y-axis direction. In addition, the positive z-axis side will be defined as the top surface side of the antenna module 1. However, in the actual usage situation, there is a case where the thickness direction of the antenna module 1 is not parallel to the vertical direction, and thus, the direction toward the top surface of the antenna module 1 is not limited to being parallel to the upward direction.

The antenna module 1 that is illustrated in FIG. 1 is compatible with two types of polarized waves both at the time of transmission and reception and is used in, for example, full-duplex communication. In the present embodiment, the antenna module 1 is compatible with polarized waves in the X-axis direction and polarized waves in the Y-axis direction, which correspond to the above two types of polarized waves. In other words, the antenna module 1 according to the present embodiment is compatible with two types of polarized waves that are perpendicular to each other. Note that the antenna module 1 is not limited to having this configuration and may be compatible with two types of polarized waves that cross each other at an angle (e.g., 75 degrees, 60 degrees, or the like) instead of at right angles.

More specifically, the antenna module 1 includes an antenna array 100, which includes a plurality of antenna elements 10, and an RFIC 20.

Each of the plurality of antenna elements 10 is a patch antenna that includes a radiation conductor 11 that is made of a thin-film pattern conductor and that is disposed parallel to a main surface of a dielectric substrate 14. The plurality of antenna elements 10 are arranged at regular intervals and included in the antenna array 100. In other words, the antenna array 100 is a patch antenna array that includes the plurality of radiation conductors 11 arranged at regular intervals on the dielectric substrate 14. Each of the plurality of radiation conductors 11 has a transmission feeding point from which a transmission signal is transmitted to the RFIC 20 and a reception feeding point at which a reception signal is received from the RFIC 20. This matter will be described later together with a detailed configuration of the antenna array 100.

In the present embodiment, the antenna array 100 includes sixteen antenna elements 10 that are in a two-dimensional perpendicular arrangement (i.e., arranged in a matrix) having four rows and four columns in the X-axis direction and the Y-axis direction. In other words, the plurality of radiation conductors 11 are arranged in the directions in which the two types of polarized waves, with which the antenna module 1 is compatible, propagate.

Note that the number of the antenna elements 10 included in the antenna array 100 is not limited to the above as long as the number is two or more. In addition, the arrangement of the plurality of antenna elements 10 is not limited to the above-mentioned arrangement. For example, the antenna array 100 may include two or more antenna elements 10 that are one-dimensionally arranged or may include three or more antenna elements 10 in a staggered arrangement. Furthermore, the plurality of radiation conductors 11 may be arranged in a direction different from each of the directions in which the polarized waves, with which the antenna module 1 is compatible, propagate.

The RFIC 20 is disposed on the dielectric substrate 14 and forms an RF signal processing circuit that performs signal processing on a transmission signal transmitted by the antenna array 100 or a reception signal received by the antenna array 100. In the present embodiment, the RFIC 20 is disposed so as to overlap an arrangement region of the antenna array 100 when the dielectric substrate 14 is viewed in plan view.

Here, the arrangement region of the antenna array 100 is a minimum region that encompasses the plurality of radiation conductors 11 when the dielectric substrate 14 is viewed in plan view, and in the present embodiment, the arrangement region of the antenna array 100 is a region having a substantially rectangular shape. In addition, when the RFIC 20 is located in the region of the antenna array 100, at least a portion of the RFIC 20 is located in the region of the antenna array 100, and particularly, the entire RFIC 20 is located in the region of the antenna array 100. In the present embodiment, the RFIC 20 is disposed on the bottom surface of the dielectric substrate 14.

Note that the arrangement of the RFIC 20 is not limited to the above-mentioned arrangement, and for example, the RFIC 20 may be disposed at a position on the top surface of the dielectric substrate 14, the position being different from that of the antenna array 100. The RF signal processing circuit is not limited to being formed of the RFIC 20 and may be formed of a plurality of radio-frequency circuit elements. For example, the RF signal processing circuit may be formed of a phase-shift circuit that adjusts the phases of transmission signals transmitted by the plurality of antenna elements 10 or the phases of reception signals received by the plurality of antenna elements 10 and an amplifier circuit that amplifies the transmission signals or the reception signals. In addition, at least a portion of the RF signal processing circuit may be embedded in the dielectric substrate 14.

[2. Configuration of Antenna Array]

A detailed configuration of the antenna array 100 will now be described with reference to FIG. 2 to FIG. 3B.

Figure 2:
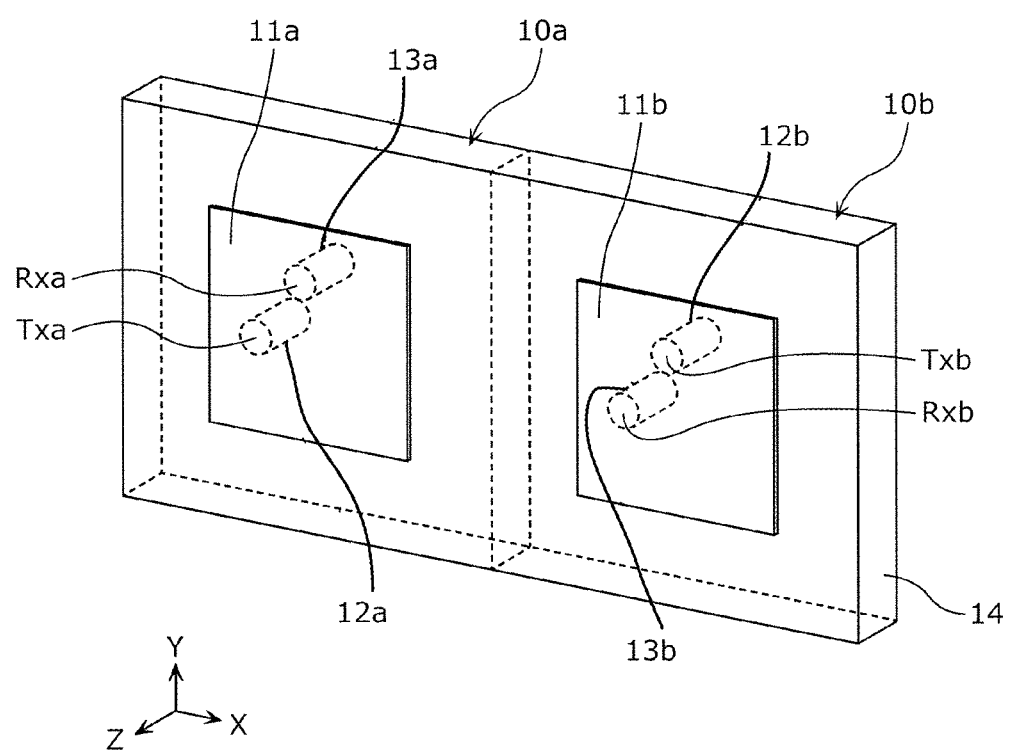
FIG. 2 is an enlarged perspective view of a portion of an antenna array.
Figure 3A:
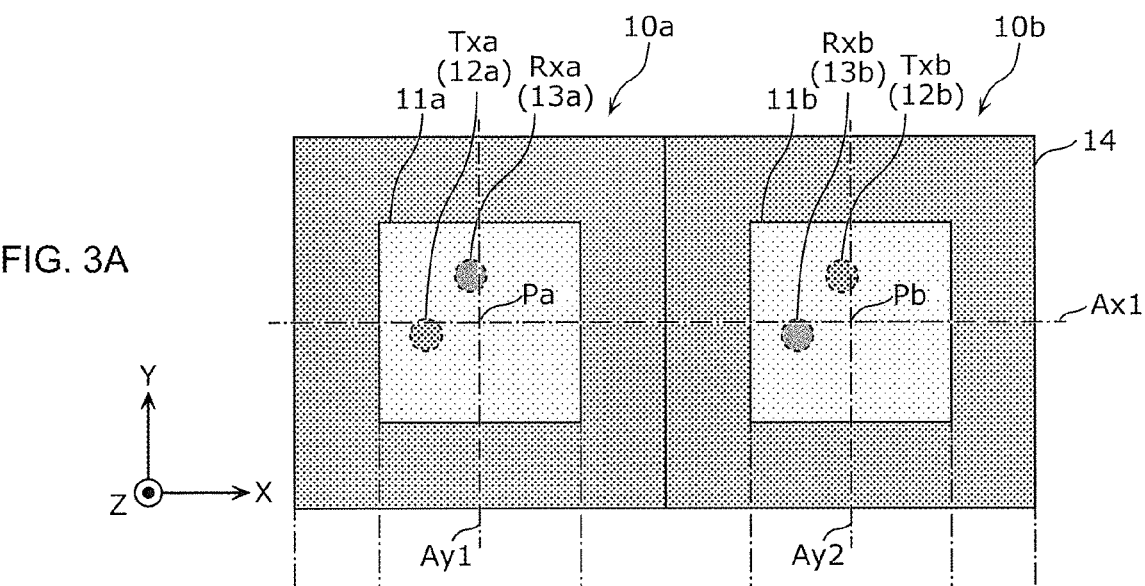
FIG. 3A and FIG. 3B are respectively a top view and a sectional view each illustrating the configuration that is illustrated in FIG. 2.

FIG. 2 is an enlarged perspective view of a portion of the antenna array 100. More specifically, FIG. 2 illustrates two antenna elements 10a and 10b that are included in the plurality of antenna elements 10 of the antenna module 1, the antenna elements 10a and 10b being adjacent to each other in the X-axis direction. FIG. 3A and FIG. 3B are respectively a top view and a sectional view each illustrating the configuration that is illustrated in FIG. 2.

Note that, in FIG. 3A, each member is illustrated by using the dotted hatching in order to make the following description simple and clear. This is common to the other top views which will be referred to in the following description. In addition, in the sectional view illustrated in FIG. 3B, some components that are actually present in other cross sections may sometimes be illustrated, or illustration of some components that are present in this cross section may sometimes be omitted in order to make the following description simple and clear.

In the present embodiment, the layout of the plurality of radiation conductors 11 is repeated for every two of the radiation conductors 11 in the X-axis direction and the Y-axis direction. Thus, the configurations of the two antenna elements 10a and 10b, which will be described below, are common to the other antenna elements 10.

As illustrated in FIG. 1 to FIG. 3B, the antenna elements 10 (antenna elements 10a and 10b), which are included in the antenna array 100, each include a portion of the dielectric substrate 14, one of the radiation conductors 11 (radiation conductors 11a and 11b) having substantially the same shape and size, and a ground conductor that will be described later. In the present embodiment, a common single pattern conductor forms the ground conductors of the antenna elements 10. Note that the ground conductor may be provided individually for each of the antenna elements 10.

As illustrated in FIG. 1, the dielectric substrate 14 according to the present embodiment has a pair of side surfaces that oppose each other in the X-axis direction and another pair of side surfaces that oppose each other in the Y-axis direction and has the shape of a substantially rectangular flat plate. Note that the shape of the dielectric substrate 14 is not limited to this shape and may be, for example, the shape of a substantially circular flat plate.

Figure 3B:
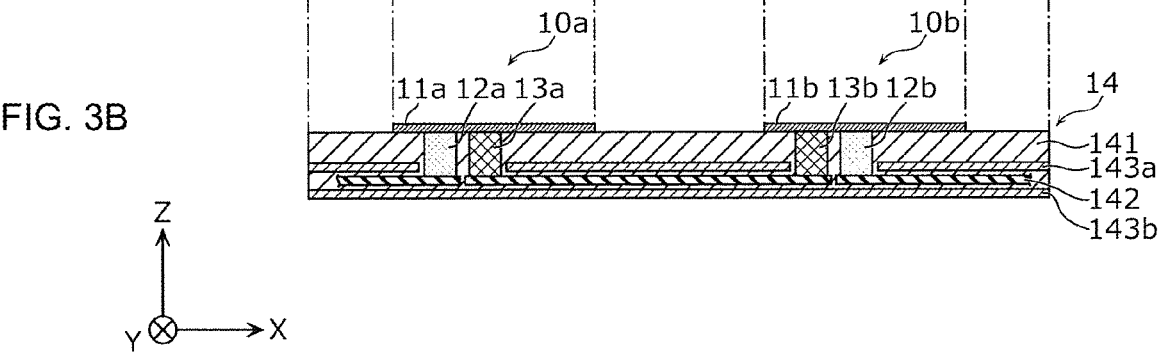

More specifically, as illustrated in FIG. 2 to FIG. 3B, the dielectric substrate 14 according to the present embodiment is a multilayer substrate that includes a plurality of dielectric layers laminated together and includes a substrate body 141 made of a dielectric material and various conductors provided on the substrate body 141. These various conductors include the pattern conductor forming the radiation conductor 11a of the antenna element 10a and the radiation conductor 11b of the antenna element 10b, via conductors 12a, 13a, 12b, and 13b, a wiring pattern conductor 142, and a pair of ground pattern conductors 143a and 143b.

When the dielectric substrate 14 is viewed in plan view, each of the radiation conductors 11a and 11b according to the present embodiment has a rectangular shape having a pair of sides that extend in the Y-axis direction and oppose each other in the X-axis direction and another pair of sides that extend in the X-axis direction and oppose each other in the Y-axis direction. In addition, in the present embodiment, each of the radiation conductors 11a and 11b is disposed on the top surface of the dielectric substrate 14. In other words, each of the radiation conductors 11a and 11b is exposed at the dielectric substrate 14.

Note that the shape and the arrangement of each of the radiation conductors 11a and 11b are not limited to those mentioned above. For example, when the dielectric substrate 14 is viewed in plan view, each of the radiation conductors 11a and 11b may have a substantially circular shape and may be provided on an inner layer of the dielectric substrate 14. In addition, each of the radiation conductors 11a and 11b may include a feeding conductor and a non-feeding conductor that is disposed above the feeding conductor.

The via conductors 12a, 12b, 13a, and 13b are conductor columns that are arranged so as to be perpendicular to the main surface of the dielectric substrate 14 and are feeding via holes that form a feeding line together with the wiring pattern conductor 142. The via conductor 12a is connected to a transmission feeding point Txa of the radiation conductor 11a. The via conductor 13a is connected to a reception feeding point Rxa of the radiation conductor 11a. The via conductor 12b is connected to a transmission feeding point Txb of the radiation conductor 11b. The via conductor 13b is connected to a reception feeding point Rxb of the radiation conductor 11b.

The wiring pattern conductor 142 is a pattern conductor that forms the feeding line together with the via conductors 12a, 12b, 13a, and 13b.

The ground pattern conductors 143a and 143b are positioned so as to face each other in the vertical direction with the wiring pattern conductor 142 interposed therebetween and are each set to a ground potential. When the dielectric substrate 14 is viewed in plan view, for example, the ground pattern conductors 143a and 143b are provided so as to extend over substantially the entire dielectric substrate 14. The ground pattern conductor 143a that is closer to the radiation conductors 11a and 11b than the ground pattern conductor 143b is has a function of serving as the ground conductors of the antenna elements 10a and 10b, which are patch antennas.

Note that the dielectric substrate 14 may be a single-layer substrate. In other words, at least a portion of the feeding line may be formed of a coaxial cable. In addition, the feeding line and the radiation conductors 11 may be structurally spaced apart from each other as long as they are electrically connected to each other. In other words, the feeding line may supply electrical power to the radiation conductors 11 through capacitive coupling.

[3. Differences Between Adjacent Antenna Elements]

When the antenna element 10a and the antenna element 10b, which are adjacent to each other in the X-axis direction, are compared with each other, the position of the transmission feeding point Txa of the radiation conductor 11a and the position of the transmission feeding point Txb of the radiation conductor 11b are different from each other, and the position of the reception feeding point Rxa of the radiation conductor 11a and the position of the reception feeding point Rxb of the radiation conductor 11b are different from each other.

More specifically, in the radiation conductor 11a, the transmission feeding point Txa is offset from a center Pa in the X-axis direction. That is to say, the transmission feeding point Txa is located at a point different from the center Pa on an axis Ax1 that passes through the center Pa of the radiation conductor 11a and a center Pb of the radiation conductor 11b and extends in the X-axis direction. In other words, the transmission feeding point Txa is set at a position where an electric field oriented in the X-axis direction, which is an example of a first direction, is excited when a transmission signal is fed thereto. In the radiation conductor 11a, the reception feeding point Rxa is offset from the center Pa in the Y-axis direction. That is to say, the reception feeding point Rxa is located at a point different from the center Pa on an axis Ay1 that passes through the center Pa and extends in the Y-axis direction. In other words, the reception feeding point Rxa is set at a position where an electric field oriented in the Y-axis direction, which is an example of a second direction, is excited when it is assumed that a reception signal is fed thereto.

In contrast, in the radiation conductor 11b, the transmission feeding point Txb is offset from the center Pb in the Y-axis direction. That is to say, the transmission feeding point Txb is located at a point different from the center Pb on an axis Ay2 that passes through the center Pb of the radiation conductor 11b and extends in the Y-axis direction. In other words, the transmission feeding point Txb is set at a position where an electric field oriented in the Y-axis direction is excited when a transmission signal is fed thereto. In the radiation conductor 11b, the reception feeding point Rxb is offset from the center Pb in the X-axis direction. That is to say, the reception feeding point Rxb is located at a point different from the center Pb on the above-mentioned axis Ax1. In other words, the reception feeding point Rxb is set at a position where an electric field oriented in the X-axis direction is excited when it is assumed that a reception signal is fed thereto.

Here, the wording "be located on an axis" includes not only being completely located on the axis but also being located in the vicinity of the axis. In other words, when the dielectric substrate 14 is viewed in plan view, the center of each of the feeding via holes may not be located on the corresponding axis, and an end portion of each of the feeding via holes may be located on the axis.

In the present embodiment, in the radiation conductor 11a, the transmission feeding point Txa is positioned so as to be offset from the center Pa in the negative X-axis direction, and the reception feeding point Rxa is positioned so as to be offset from the center Pa in the positive Y-axis direction. In the radiation conductor 11b, the transmission feeding point Txb is positioned so as to be offset from the center Pb in the positive Y-axis direction, and the reception feeding point Rxb is positioned so as to be offset from the center Pb in the negative X-axis direction.

In other words, when the dielectric substrate 14 is viewed in plan view, the position of the transmission feeding point Txa in the radiation conductor 11a and the position of the reception feeding point Rxb in the radiation conductor 11b substantially match each other, and the position of the reception feeding point Rxa in the radiation conductor 11a and the position of the transmission feeding point Txb in the radiation conductor 11b substantially match each other.

Here, the wording "substantially match each other" includes not only the case where the positions of feeding points completely match each other but also the case where the positions of the feeding points substantially match each other and the case where the positions of the feeding points are slightly displaced from each other due to, for example, the impedances of a feeding line and a feeding circuit that are connected to an antenna element. In other words, the term "substantially" includes an error of about a few percent.

[4. Mechanism for Improving Isolation]

As described above, in the antenna module 1 according to the present embodiment, polarized waves formed by the transmission feeding point in one of the antenna elements 10 and polarized waves formed by the transmission feeding point in another one of the antenna elements 10 that is adjacent to the one antenna element 10 in the X-axis direction are different from each other, and polarized waves formed by the reception feeding point in the one antenna element 10 and polarized waves formed by the reception feeding point in the other antenna element 10 are different from each other. As a result, the isolation between these antenna elements 10 can be improved, and thus, the improvement of communication quality is achieved. A mechanism for improving the isolation between the antenna elements 10 in the present embodiment will be described below using a comparative example in which an antenna array that includes a plurality of the same antenna elements 10b is provided. In other words, in the comparative example, polarized waves formed by a transmission feeding point in one of the antenna elements and polarized waves formed by a transmission feeding point in another one of the antenna elements that is adjacent to the one antenna element are the same as each other, and polarized waves formed by the reception feeding point in the one antenna element and polarized waves formed by the reception feeding point in the other antenna element are the same as each other.

Figure 4:
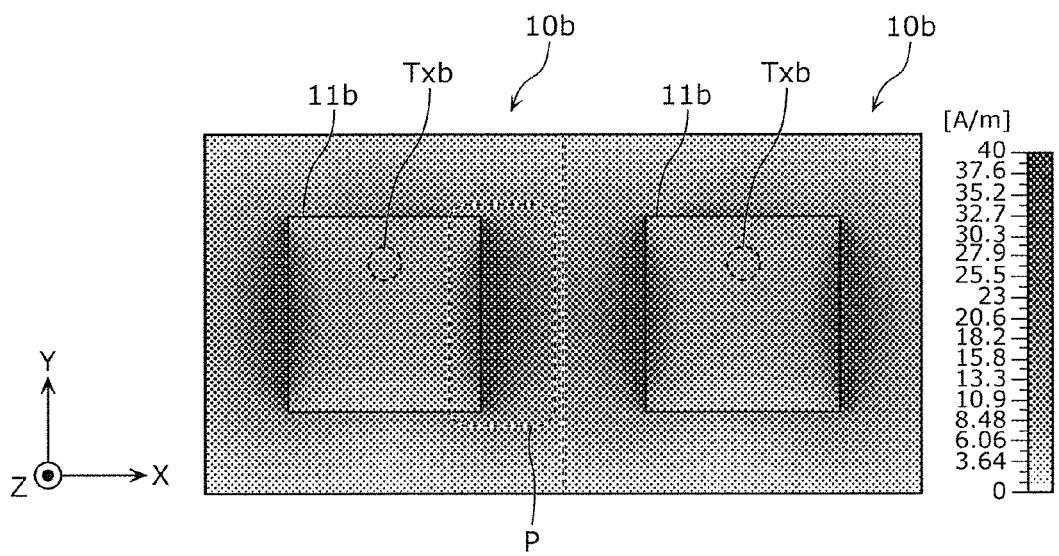
FIG. 4 is a diagram illustrating magnetic field distribution of two adjacent antenna elements in a comparative example.
Figure 5:
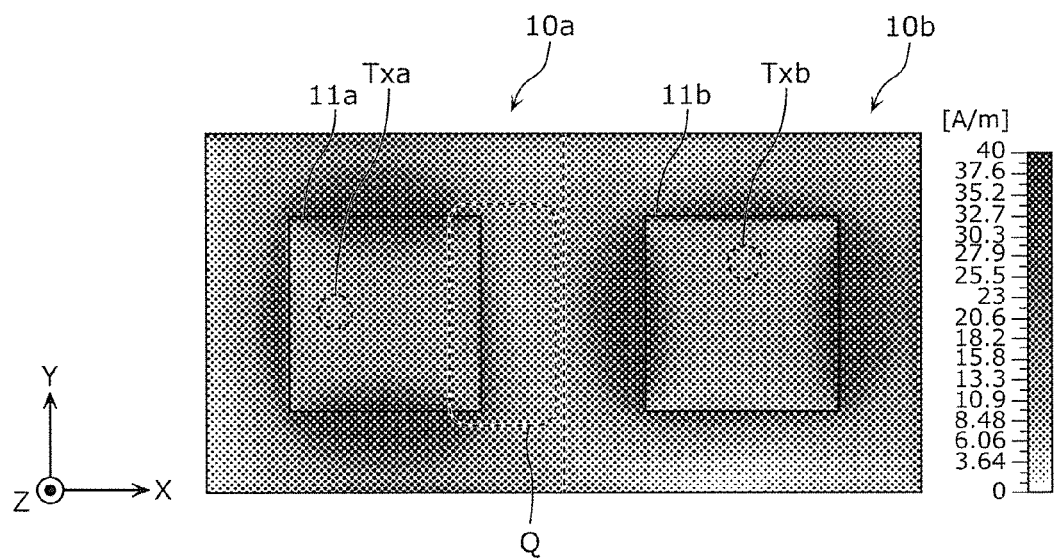
FIG. 5 is a diagram illustrating magnetic field distribution of two adjacent antenna elements in the embodiment.

FIG. 4 is a diagram illustrating magnetic field distribution of two of the antenna elements 10b in the comparative example that are adjacent to each other. More specifically, FIG. 4 illustrates the magnetic field distribution when a transmission signal is fed to each of the transmission feeding points Txb in a configuration in which the two antenna elements 10b are arranged adjacent to each other. FIG. 5 is a diagram illustrating magnetic field distribution of the two adjacent antenna elements 10a and 10b in the present embodiment. More specifically, FIG. 5 illustrates the magnetic field distribution when a transmission signal is fed to each of the transmission feeding points Txa and Txb in the antenna elements 10a and 10b, which are illustrated in FIG. 2 to FIG. 3B.

As is clear from FIG. 4 and FIG. 5, the intensity of the magnetic field in the antenna element 10a becomes high in a direction perpendicular to the direction in which the transmission feeding point Txa is offset from the center of the radiation conductor 11a, and the intensity of the magnetic field in the antenna element 10b becomes high in a direction perpendicular to the direction in which the transmission feeding point Txb is offset from the center of the radiation conductor 11b.

Thus, in the antenna element 10b, in which the transmission feeding point Txb is offset from the center of the radiation conductor 11b in the Y-axis direction, the intensity of the magnetic field in the X-axis direction is high (see portion P in FIG. 4). Therefore, in the configuration according to the comparative example, the intensity of the magnetic field between the two adjacent radiation conductors 11b becomes high as illustrated in FIG. 4.

In contrast, in the antenna element 10a, in which the transmission feeding point Txa is offset from the center of the radiation conductor 11a in the X-axis direction, the intensity of the magnetic field in the X-axis direction is low (see portion Q in FIG. 5). Therefore, as illustrated in FIG. 5, in the configuration according to the present embodiment, the intensity of the magnetic field between the two adjacent radiation conductors 11a and 11b becomes lower than the intensity of the magnetic field between the two adjacent radiation conductors 11b in the comparative example.

In other words, in the configuration according to the present embodiment, the radiation conductors 11a and 11b of the two adjacent antenna elements 10a and 10b are less likely to be magnetically influenced by each other compared with the configuration according to the comparative example. That is to say, according to the configuration of the present embodiment, the isolation between the adjacent antenna elements 10 can be improved compared with the configuration of the comparative example.

Figure 6:
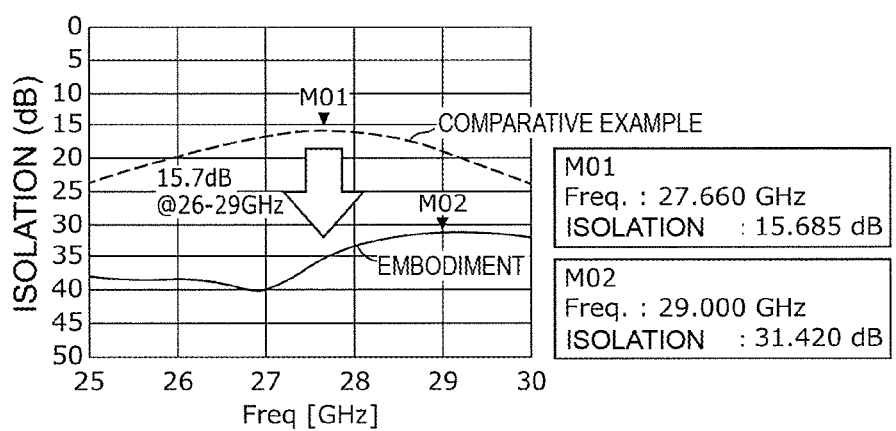
FIG. 6 is a graph illustrating isolation characteristics between two adjacent antenna elements.

FIG. 6 is a graph illustrating isolation characteristics between the two adjacent antenna elements illustrated in FIG. 4 and isolation characteristics between the two adjacent antenna elements illustrated in FIG. 5. More specifically, FIG. 6 illustrates, in absolute values, the ratio between the strength of a transmission signal that is fed to the feeding point of one of the antenna elements in FIG. 4 and the strength of the transmission signal that is propagated to the other of the antenna elements in FIG. 4 and obtained at the feeding point of the other antenna element and the ratio between the strength of a transmission signal that is fed to the feeding point of one of the antenna elements in FIG. 5 and the strength of the transmission signal that is propagated to the other of the antenna elements illustrated in FIG. 5 and obtained at the feeding point of the other antenna element. Note that markers are added to the graph in FIG. 6. In addition, tables each showing the frequency (Freq.) and the isolation at one of the markers in the graph (each marker is represented by "M*" in the graph where "*" is a numerical value following the letter "M") are illustrated on the right-hand side of the graph.

As illustrated in FIG. 6, according to the configuration of the present embodiment, which is illustrated in FIG. 5, compared with the configuration of the comparative example, which is illustrated in FIG. 4, the worst value of the isolation in a used band (e.g., 26 GHz to 29 GHz) can be improved from 15.685 dB to 31.420 dB, and the average value of the isolation can be improved by 15.7 dB.

As described above, according to the present embodiment, by causing polarized waves formed by the transmission feeding point in one of the antenna elements 10 to be different from polarized waves formed by the transmission feeding point in another one of the antenna elements 10 that is adjacent to the one antenna element 10, the isolation at the time of transmission can be improved. This is common to the reception feeding points and polarized waves formed by the reception feeding points, and thus, in the adjacent antenna elements 10, the isolation at the time of reception can be improved.

In other words, in the antenna module 1 according to the present embodiment, as a result of polarized waves formed by the transmission feeding point in one of the radiation conductors 11 being different from polarized waves formed by the transmission feeding point in another one of the radiation conductors 11 that is adjacent to the one radiation conductor 11, the isolation between the adjacent radiation conductors 11 at the time of transmission can be improved. Similarly, as a result of polarized waves formed by the reception feeding point in one of the adjacent radiation conductors 11 being different from polarized waves formed by the reception feeding point in the other one of the adjacent radiation conductors 11, the isolation between the adjacent radiation conductors 11 at the time of reception can be improved. Therefore, the isolation between the adjacent radiation conductors 11 is improved both at the time of transmission and reception, and thus, the improvement of the communication quality of the antenna module 1, which includes the antenna array 100, is achieved.

According to the antenna module 1 of the present embodiment, in the radiation conductor 11a that is included in the plurality of radiation conductors 11 and that is an example of a first radiation conductor, the transmission feeding point is set at a position where the electric field of polarized waves in the X-axis direction (an example of the first direction) is excited, and in the radiation conductor 11b that is an example of a second radiation conductor and that is adjacent to the first radiation conductor, the transmission feeding point is set at a position where the electric field of polarized waves in the Y-axis direction (an example of the second direction) is excited. In addition, in the radiation conductor 11a, the reception feeding point is set at a position where the electric field in the Y-axis direction is excited, and in the radiation conductor 11b, the reception feeding point is set at a position where the electric field of polarized waves in the X-axis direction is excited. As a result, the two types of polarized waves that are formed at the time of transmission can match the two types of polarized waves that are formed at the time of reception. Therefore, the antenna module according to the present embodiment is useful as an antenna module that has a high communication quality and that is used in communication using the same two types of polarized waves both at the time of transmission and reception.

According to the present embodiment, when the dielectric substrate 14 is viewed in plan view, the position of the transmission feeding point Txa of the radiation conductor 11a and the position of the reception feeding point Rxb of the radiation conductor 11b substantially match each other, and the position of the reception feeding point Rxa of the radiation conductor 11a and the position of the transmission feeding point Txb of the radiation conductor 11b substantially match each other. As a result, for example, the feeding via holes and so forth that are connected to their respective feeding points in the radiation conductor 11a can be formed at positions that are the same as those in the radiation conductor 11b, and thus, a design process can be eliminated in a process of manufacturing the antenna module.

According to the antenna module 1 of the present embodiment, the radiation conductor 11a and the radiation conductor 11b are positioned adjacent to each other in the X-axis direction. As a result, a desired beam pattern can be obtained in a plane that is perpendicular to the dielectric substrate 14 and parallel to the X-axis direction, and the space between the radiation conductor 11a and the radiation conductor 11b can be reduced. Therefore, the reduction in the size of the antenna module 1 is achieved.

According to the antenna module 1 of the present embodiment, the directions of two types of polarized waves that are excited by each of the radiation conductors 11 are perpendicular to each other. As a result, in each of the radiation conductor 11a and the radiation conductor 11b, the isolation of the two types of polarized waves that are formed can be optimized. In other words, in each of the radiation conductors 11, the isolation between the transmission feeding point and the reception feeding point can be optimized, and thus, the reception band noise generated as a result of a transmission signal leaking to a reception system can be suppressed, so that further improvement of the communication quality is achieved.

According to the present embodiment, since the RFIC 20 is disposed so as to overlap the arrangement region of the antenna array 100 when the dielectric substrate 14 is viewed in plan view, the reduction in the size of the antenna module 1 is achieved. In addition, the feeding line connecting the RFIC 20 and the antenna array 100 to each other can be shortened. Thus, the loss due to this feeding line is reduced, and further improvement of the communication quality is achieved.

[5. Differences Between Four Adjacent Antenna Elements]

The method of improving isolation has been described above focusing on the antenna elements 10 that are included in the plurality of antenna elements 10 of the antenna array 100 and that are adjacent to each other in the X-axis direction. In the present embodiment, the improvement in the isolation between the antenna elements 10 that are adjacent to each other in the Y-axis direction is also achieved by a similar method. Accordingly, the following description focuses on adjacent four antenna elements including the above-described two antenna elements 10a and 10b and another two antenna elements that are adjacent to the antenna elements 10a and 10b in the Y-axis direction.

Figure 7:
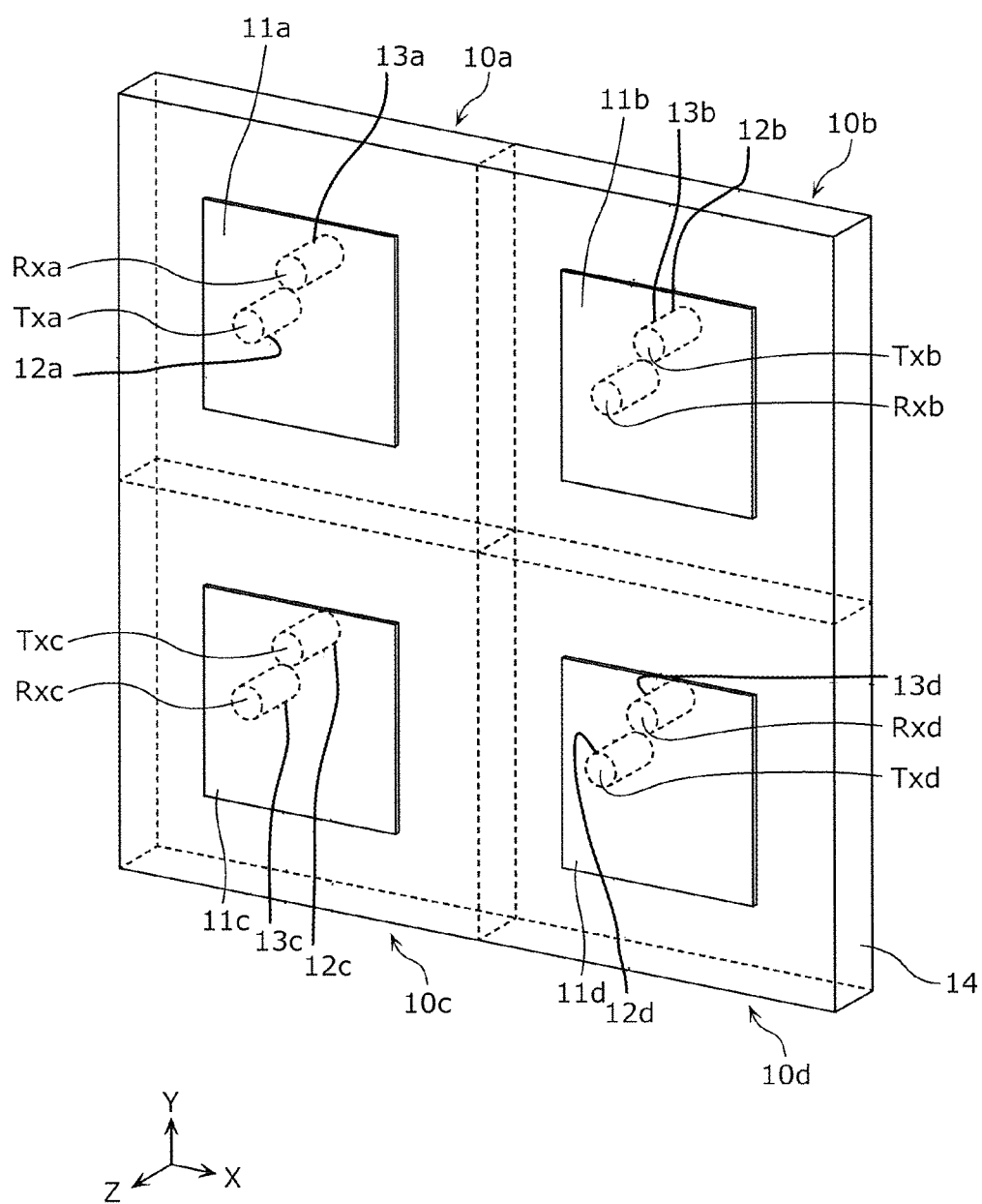
FIG. 7 is an enlarged perspective view of a portion of the antenna array.
Figure 8:
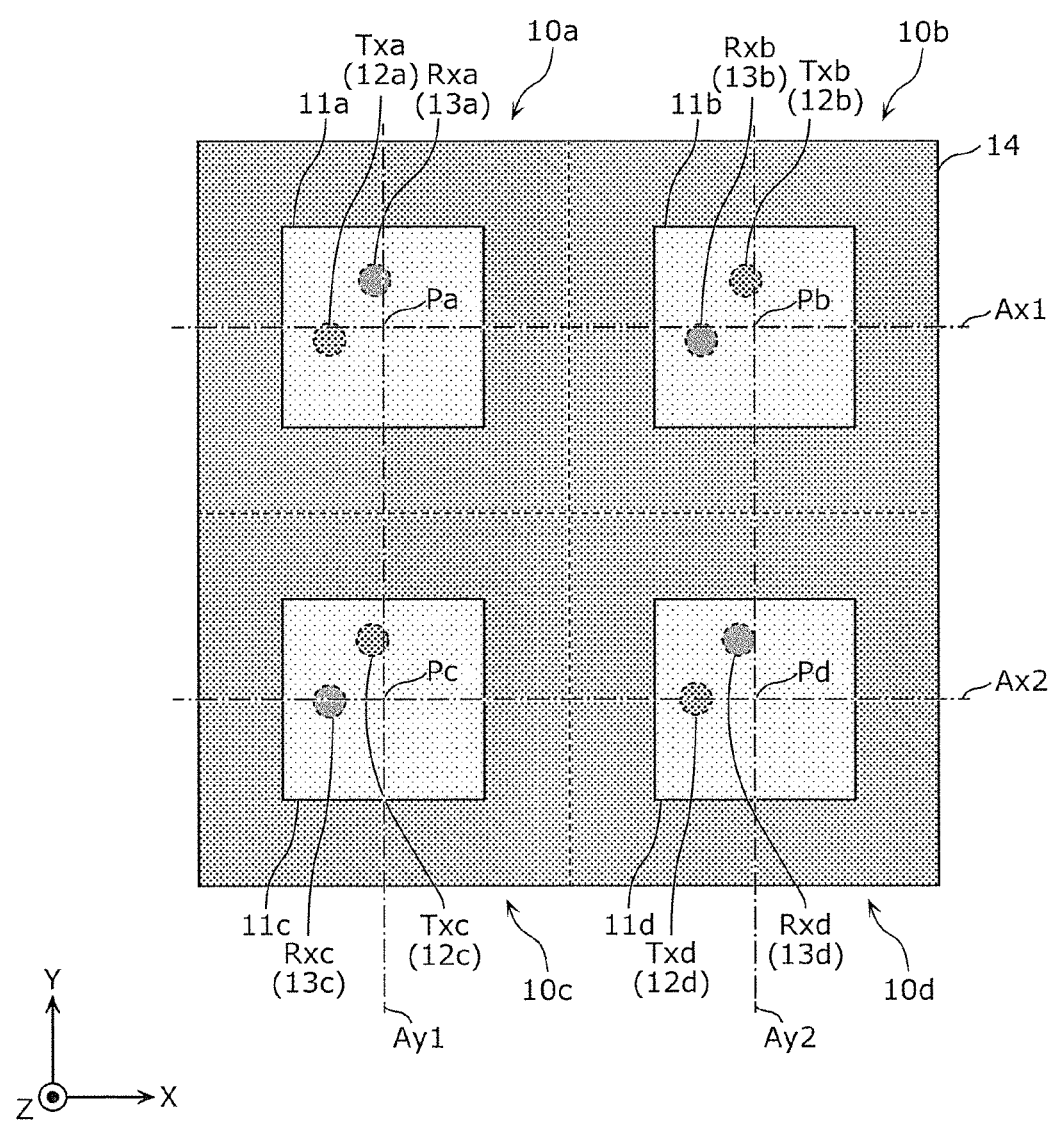
FIG. 8 is a top view illustrating the configuration that is illustrated in FIG. 7.

FIG. 7 is an enlarged perspective view of a portion of the antenna array 100. More specifically, FIG. 7 illustrates the two antenna elements 10a and 10b that are included in the plurality of antenna elements 10 of the antenna module 1 and that are adjacent to each other in the X-axis direction and two adjacent antenna elements 10c and 10d that are adjacent to the antenna elements 10a and 10b in the Y-axis direction. FIG. 8 is a top view illustrating the configuration that is illustrated in FIG. 7.

The antenna element 10c is adjacent to the above-described antenna element 10a in the Y-axis direction and is adjacent to the above-described antenna element 10b in a direction different from the X-axis and the Y-axis (i.e., an oblique direction). More specifically, the antenna element 10c is disposed on the negative-Y-axis-direction side of the antenna element 10a and includes a radiation conductor 11c and a ground conductor (not illustrated). The radiation conductor 11c has a transmission feeding point Txc connected to a via conductor 12c and a reception feeding point Rxc connected to a via conductor 13c.

The antenna element 10d is adjacent to the above-described antenna element 10b in the Y-axis direction and adjacent to the above-described antenna element 10a in a direction different from the X-axis and the Y-axis (i.e., an oblique direction). More specifically, the antenna element 10d is disposed on the negative-Y-axis-direction side of the antenna element 10b and includes a radiation conductor 11d and a ground conductor (not illustrated). The radiation conductor 11d has a transmission feeding point Txd connected to a via conductor 12d and a reception feeding point Rxd connected to a via conductor 13d.

Note that the radiation conductors 11c and 11d are configured in a similar manner to the above-described radiation conductors 11a and 11b. In addition, the via conductors 12c, 12d, 13c, and 13d are configured in a similar manner to the above-described via conductors 12a, 12b, 13a, and 13b. Thus, descriptions of detailed configurations of these radiation conductors and via conductors will be omitted.

Here, when the antenna element 10c and the antenna element 10d, which are adjacent to each other in the X-axis direction, are compared with each other, in the radiation conductors 11c and 11d, the position of the transmission feeding point Txc and the position of the transmission feeding point Txd are different from each other, and the position of the reception feeding point Rxc and the position of the reception feeding point Rxd are different from each other. In addition, when the antenna element 10a and the antenna element 10c, which are adjacent to each other in the Y-axis direction, are compared with each other, in the radiation conductors 11a and 11c, the position of the transmission feeding point Txa and the position of the transmission feeding point Txc are different from each other, and the position of the reception feeding point Rxa and the position of the reception feeding point Rxc are different from each other. Furthermore, when the antenna element 10b and the antenna element 10d, which are adjacent to each other in the Y-axis direction, are compared with each other, in the radiation conductors 11b and 11d, the position of the transmission feeding point Txb and the position of the transmission feeding point Txd are different from each other, and the position of the reception feeding point Rxb and the position of the reception feeding point Rxd are different from each other.

More specifically, in the radiation conductors 11c, the transmission feeding point Txc is offset from a center Pc in the Y-axis direction. That is to say, the transmission feeding point Txc is located at a point different from the center Pc on the axis Ay1 that passes through the center Pa of the radiation conductor 11a and the center Pc of the radiation conductor 11c and extends in the Y-axis direction. In other words, the transmission feeding point Txc is set at a position where an electric field oriented in the Y-axis direction is excited when a transmission signal is fed thereto. In addition, in the radiation conductor 11c, the reception feeding point Rxc is offset from the center Pc in the X-axis direction. That is to say, the reception feeding point Rxc is located at a point different from the center Pc on an axis Ax2 that passes through the center Pc of the radiation conductor 11c and a center Pd of the radiation conductor 11d and extends in the X-axis direction. In other words, the reception feeding point Rxc is set at a position where an electric field oriented in the X-axis direction is excited when it is assumed that a reception signal is fed thereto.

In contrast, in the radiation conductor 11d, the transmission feeding point Txd is offset from the center Pd in the X-axis direction. That is to say, the transmission feeding point Txd is located at a point different from the center Pd on the axis Ax2. In other words, the transmission feeding point Txd is set at a position where an electric field oriented in the X-axis direction is excited when a transmission signal is fed thereto. In addition, in the radiation conductor 11d, the reception feeding point Rxd is offset from the center Pd in the Y-axis direction. That is to say, the reception feeding point Rxd is located at a point different from the center Pd on the axis Ay2 passing through the center Pb of the radiation conductor 11b and the center Pd of the radiation conductor 11d and extending in the Y-axis direction. In other words, the reception feeding point Rxd is set at a position where an electric field oriented in the Y-axis direction is excited when it is assumed that a reception signal is fed thereto.

In the present embodiment, in the radiation conductor 11c, the transmission feeding point Txc is positioned so as to be offset from the center Pc in the positive Y-axis direction, and the reception feeding point Rxc is positioned so as to be offset from the center Pc in the negative X-axis direction. In addition, in the radiation conductor 11d, the transmission feeding point Txd is positioned so as to be offset from the center Pd in the negative X-axis direction, and the reception feeding point Rxd is positioned so as to be offset from the center Pd in the positive Y-axis direction.

In other words, when the dielectric substrate 14 is viewed in plan view, the position of the transmission feeding point Txa in the radiation conductor 11a and the position of the reception feeding point Rxc in the radiation conductor 11c substantially match each other, and the position of the reception feeding point Rxa in the radiation conductor 11a and the position of the transmission feeding point Txc in the radiation conductor 11c substantially match each other. In addition, the position of the transmission feeding point Txb in the radiation conductor 11b and the position of the reception feeding point Rxd in the radiation conductor 11d substantially match each other, and the position of the reception feeding point Rxb in the radiation conductor 11b and the position of the transmission feeding point Txd in the radiation conductor 11d substantially match each other.

In other words, in two of the radiation conductors 11, the two radiation conductors 11 being adjacent to each other in the X-axis direction or the Y-axis direction, the position of the transmission feeding point of one of the two radiation conductors 11 and the position of the reception feeding point of the other of the two radiation conductors 11 substantially match each other. In addition, the position of the reception feeding point of the one radiation conductor 11 and the position of the transmission feeding point of the other radiation conductor 11 substantially match each other. As a result, for example, in each of the radiation conductor 11a (an example of the first radiation conductor), the radiation conductor 11b (an example of the second radiation conductor), the radiation conductor 11c (an example of a third radiation conductor), and the radiation conductor 11d (an example of a fourth radiation conductor), the feeding via holes and so forth that are connected to their respective feeding points can be formed at the same positions, and thus, a design process can be eliminated in a process of manufacturing the antenna module 1.

In two radiation conductors that are adjacent to each other in a direction different from the X-axis direction and the Y-axis direction (i.e., an oblique direction), the position of the transmission feeding point in one of the radiation conductors and the position of the transmission feeding point in the other of the radiation conductors substantially match each other. In addition, the position of the reception feeding point in the one radiation conductor and the position of the reception feeding point in the other radiation conductor substantially match each other. As a result, for example, in the radiation conductor 11a and the radiation conductor 11d or in the radiation conductor 11b and the radiation conductor 11c, the feeding via holes and so forth that are connected to their respective feeding points can be formed at the same positions, and thus, a design process can be eliminated in a process of manufacturing the antenna module 1.

Thus, according to the present embodiment, in not only the antenna elements 10 that are adjacent to each other in the X-axis direction but also in the antenna elements 10 that are adjacent to each other in the Y-axis direction, by causing polarized waves formed by the transmission feeding point in one of the antenna elements 10 to be different from polarized waves formed by the transmission feeding point in the other of the antenna elements 10, the isolation at the time of transmission can be improved. In addition, this is common to the reception feeding points and polarized waves formed by the reception feeding points. Therefore, the isolation between the antenna elements 10 that are adjacent to each other in the X-axis direction and the isolation between the antenna elements 10 that are adjacent to each other in the Y-axis direction can be improved both at the time of transmission and reception.

In addition, in the plurality of radiation conductors 11 according to the present embodiment, the layout of the transmission feeding points and the reception feeding points is repeated for every two of the radiation conductors 11 in the X-axis direction and the Y-axis direction. In other words, the above-described configurations of the adjacent antenna elements 10 are not limited to being applied to some of the plurality of antenna elements 10 included in the antenna array 100 (e.g., two or four antenna elements) and are applied to all the antenna elements 10. As a result, the isolation between adjacent ones of the radiation conductors 11 over the entire antenna array 100 can be improved, and thus, further improvement of the communication quality is achieved.

Note that the above-described configurations of the adjacent antenna elements 10 may only be applied to some of the plurality of antenna elements 10 included in the antenna array 100. For example, the above-described configurations of the adjacent antenna elements 10 may only be applied to each pair of the antenna elements 10 that are adjacent to each other in the X-axis direction or may only be applied to each pair of the antenna elements 10 that are adjacent to each other in the Y-axis direction.

[6. Application to Communication Device]

The antenna module 1 that has been described above can be applied to a communication device.

Figure 9:
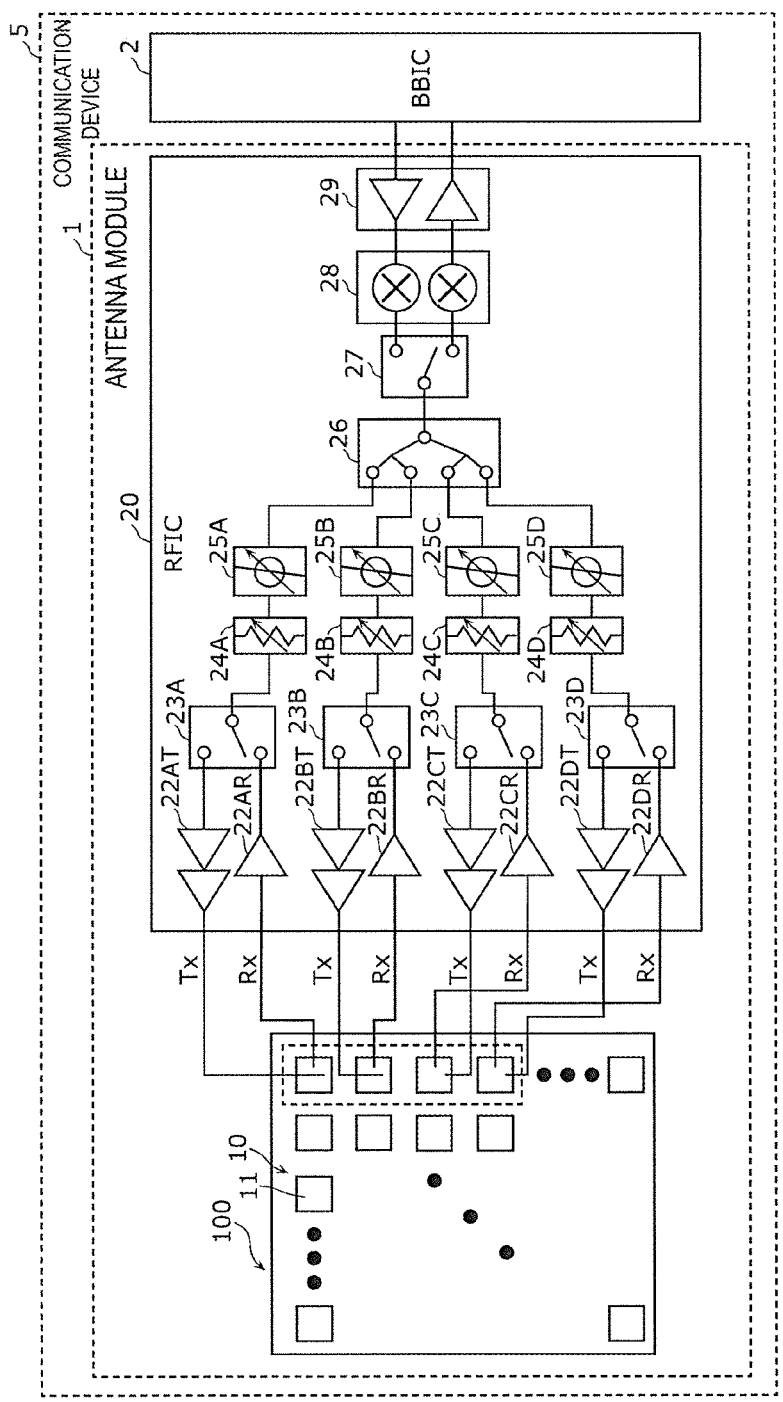
FIG. 9 is a block diagram illustrating an example of a communication device to which the antenna module is applied.

FIG. 9 is a block diagram illustrating an example of a communication device 5 to which the antenna module 1 is applied. Note that, in order to make the following description simple and clear, FIG. 9 only illustrates the configurations that correspond to the four antenna elements 10 that are surrounded by a dashed line among the plurality of antenna elements 10 included in the antenna array 100, and illustration of the configurations that correspond to the other antenna elements 10 that are configured in a manner similar to the four antenna elements 10 is omitted. In addition, in FIG. 9, the transmission feeding points and the reception feeding points in the antenna module 1 are illustrated at the same positions in each of the plurality of radiation conductors 11 in order to make the connection configuration simple and clear. These matters are common to the following description of the communication device.

The communication device 5 illustrated in FIG. 9 uses the TDD system, and more specifically, the communication device 5 includes the above-described antenna module 1, which includes the antenna array 100 and the RFIC 20, and a BBIC 2 that is included in a baseband signal processing circuit. The communication device 5 up-converts a signal transmitted from the BBIC 2 to the antenna module 1 into a radio-frequency signal and radiates the radio-frequency signal from the antenna array 100. In addition, the communication device 5 down-converts a radio-frequency signal received by the antenna array 100 and performs signal processing on the signal by using the BBIC 2.

The RFIC 20 includes power amplifiers 22AT to 22DT, low-noise amplifiers 22AR to 22DR, switches 23A to 23D and 27, attenuators 24A to 24D, phase shifters 25A to 25D, a signal synthesizer/duplexer 26, a mixer 28, and an amplifier circuit 29.

A signal transmitted from the BBIC 2 is amplified by the amplifier circuit 29 and up-converted by the mixer 28. The transmission signal that has been up-converted to a radio-frequency signal is separated into four signals by the signal synthesizer/duplexer 26, and each of the four signals passes through one of four signal paths and is fed to one of the radiation conductors 11. In this case, by individually adjusting the degrees of the phase shift of the phase shifters 25A to 25D each of which is disposed on one of the signal paths, the directivity of the antenna array 100 can be adjusted.

Reception signals that are received by the radiation conductors 11 and that are radio-frequency signals each pass through one of four different signal paths. Then, the reception signals are combined together by the signal synthesizer/duplexer 26, down-converted by the mixer 28, amplified by the amplifier circuit 29, and transmitted to the BBIC 2.

For example, the RFIC 20 is formed as a one-chip integrated circuit component including the above-described circuit configuration.

Here, each of the switches 23A to 23D and 27 switches between one of the transmission signal paths and the corresponding one of the reception signal paths in accordance with a control signal that is inputted thereto from a controller such as the BBIC 2. The communication device 5 that is configured as described above and illustrated in FIG. 9 uses the TDD system for transmitting a transmission signal and receiving a reception signal at different timings.

Note that the antenna module 1 and the communication device are not limited to supporting the above-mentioned communication system. For example, the antenna module 1 and the communication device may support a system, such as the PDD system or the FDD system, for simultaneously performing transmission and reception. In other words, the antenna array 100 may transmit a transmission signal and receive a reception signal simultaneously. In particular, since the antenna module 1 is compatible with two types of polarized waves both at the time of transmission and reception, the antenna module 1 is useful as an antenna module that has a high communication quality and that is used in dual-polarized full-duplex communication.

Figure 10:
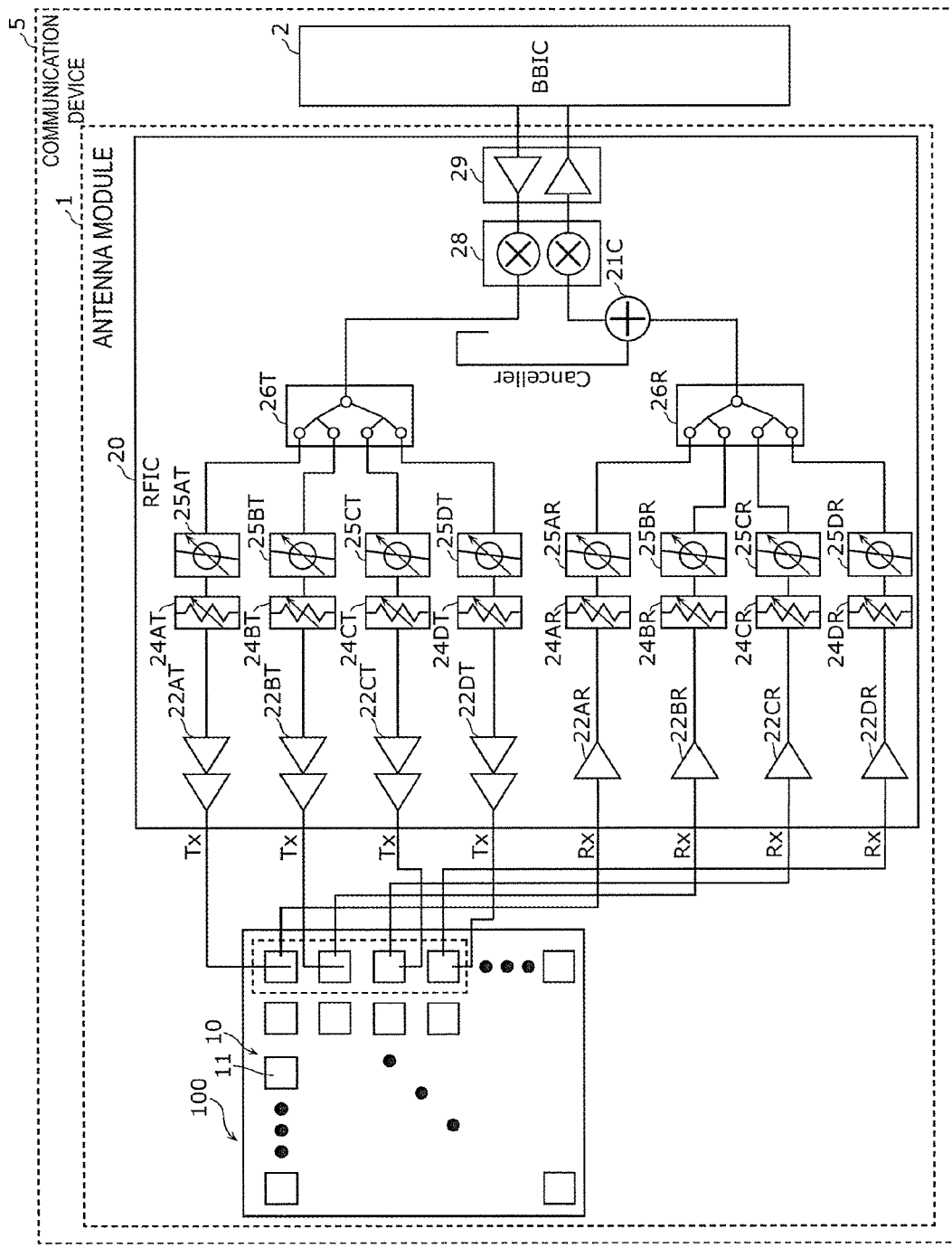
FIG. 10 is a block diagram illustrating another example of the communication device to which the antenna module is applied.

FIG. 10 is a block diagram illustrating another example of the communication device 5 to which the antenna module 1 is applied.

The difference between the communication device 5 that is illustrated in FIG. 10 and the communication device 5 that is illustrated in FIG. 9 is that the communication device 5 in FIG. 10 does not include the switches 23A to 23D and 27, each of which switches between one of the transmission signal paths and the corresponding one of the reception signal paths, and accordingly, the circuit configuration that is shared by one of the signal paths of a transmission system and the corresponding one of the signal paths of a reception system in the communication device 5 in FIG. 9 is provided individually for each of the signal paths of the transmission system and the signal paths of the reception system in the communication device 5 in FIG. 10.

More specifically, the communication device 5 illustrated in FIG. 10 includes the following components instead of the attenuators 24A to 24D, the phase shifters 25A to 25D, and the signal synthesizer/duplexer 26 that are arranged on a signal path shared by the transmission system and the reception system that are illustrated in FIG. 9. In other words, the communication device 5 illustrated in FIG. 10 includes attenuators 24AT to 24DT, phase shifters 25AT to 25DT, and a signal synthesizer/duplexer 26T that are arranged on the signal paths of the transmission system and attenuators 24AR to 24DR, phase shifters 25AR to 25DR, and a signal synthesizer/duplexer 26R that are arranged on the signal paths of the reception system. In addition, the communication device 5 illustrated in FIG. 10 further includes a cancel circuit 21C that is disposed on the signal paths of the reception system and that cancels the leakage of a transmission signal.

For example, the cancel circuit 21C is an adder that has an amplitude adjusting function, a phase adjusting function, and so forth and cancels a transmission signal included in a reception signal, which is inputted thereto, by superimposing a cancel signal that has a phase opposite to that of the transmission signal and an amplitude the same as that of the transmission signal onto the reception signal. More specifically, the cancel circuit 21C generates a cancel signal by adjusting the amplitude and the phase of a transmission signal detected by a transmission line that is electromagnetically coupled to another transmission line forming a transmission path.

In other words, a transmission signal that is transmitted from the BBIC 2 and then up-converted by the mixer 28 is separated into four signals by the signal synthesizer/duplexer 26T, and each of the four signals passes through one of the four transmission paths, on which the attenuators 24AT to 24DT and the phase shifters 25AT to 25DT are arranged, and is fed to one of the radiation conductors 11. In this case, by individually adjusting the degrees of the phase shift of the phase shifters 25AT to 25DT arranged on the signal paths, the directivity of a transmission signal of the antenna array 100 can be adjusted.

Reception signals that are received by the radiation conductors 11 and that are radio-frequency signals each pass through one of the four different signal paths, on which the attenuators 24AR to 24DR and the phase shifters 25AR to 25DR are arranged, and are combined together by the signal synthesizer/duplexer 26R. Then, a transmission signal component that is included in the combined reception signal is cancelled by the cancel circuit 21C, and the reception signal is down-converted by the mixer 28. In this case, by individually adjusting the degrees of the phase shift of the phase shifters 25AR to 25DR arranged on the reception paths, the directivity of a reception signal of the antenna array 100 can be adjusted.

The communication device 5 that is configured as described above and illustrated in FIG. 10 can be used in dual-polarized full-duplex communication. Note that, in this case, the frequency band of a transmission signal and the frequency band of a reception signal may be different from each other. In other words, the antenna module 1 and the communication device 5 may support the FDD system.

Note that the RFIC 20 that is illustrated in FIG. 9 and the RFIC 20 that is illustrated in FIG. 10 do not need to include some of the above-mentioned circuit elements. For example, in the case where it is not necessary to attenuate a reception signal, the RFIC 20 illustrated in FIG. 10 does not need to include the attenuators 24AR to 24DR. In addition, the RFIC 20 may have only the transmission paths or may have only the reception paths. The antenna module 1 may be applied to a system for transmitting and receiving radio-frequency signals in a plurality of frequency bands (multi-band) as well as radio-frequency signals in a single frequency band (band). In other words, the antenna module 1 may be configured to be capable of being connected to circuit configurations of two or more systems each having the RFIC 20, and the system to which the antenna module 1 is connected may be switched by a switch.

(Modification)

Although the antenna module and the communication device including the antenna module according to the embodiment of the present disclosure have been described above using the embodiment, the present disclosure is not limited to the above-described embodiment. Other embodiments that are realized by combining arbitrary components of the above-described embodiment and modifications that are obtained by making various modifications, which are devised by those skilled in the art within the gist of the present disclosure, to the above-described embodiment are also included in the scope of the present disclosure.

For example, in the above-description, when the dielectric substrate 14 is viewed in plan view, the position of the transmission feeding point Txa in the radiation conductor 11a (an example of the first radiation conductor) and the position of the reception feeding point Rxb in the radiation conductor 11b (an example of the second radiation conductor that is adjacent to the first radiation conductor) substantially match each other, and the position of the reception feeding point Rxa in the radiation conductor 11a and the position of the transmission feeding point Txb in the radiation conductor 11b substantially match each other. However, the positional relationships between the transmission feeding points and the reception feeding points in the first radiation conductor and the second radiation conductor are not limited to these and may be, for example, the positional relationships such as those illustrated in FIG. 11.

Figure 11:
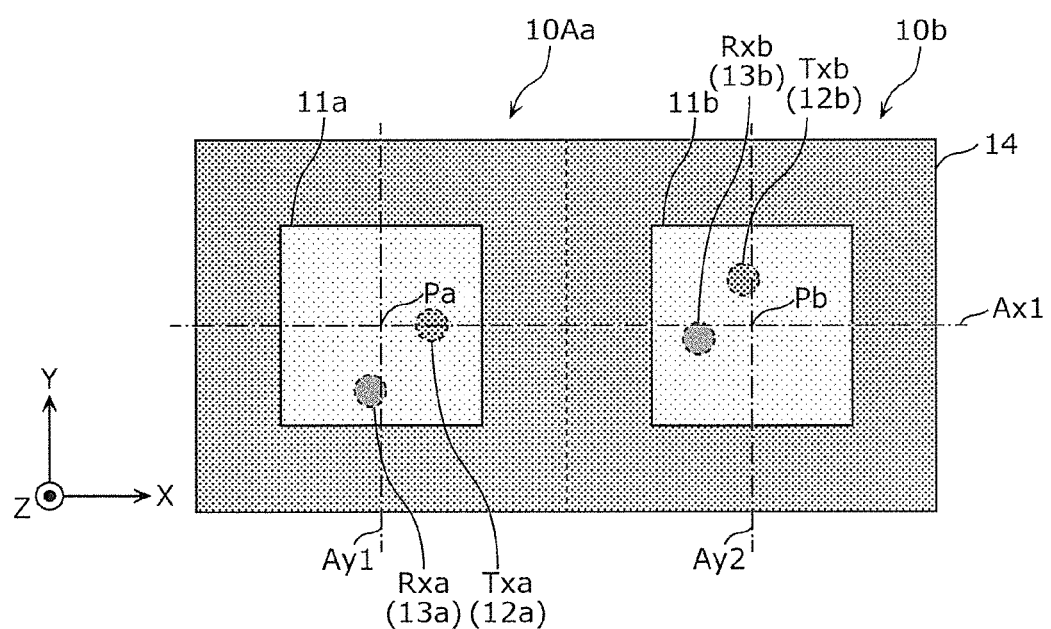
FIG. 11 is an enlarged top view of a portion of an antenna array according to a modification.

FIG. 11 is an enlarged top view of a portion of an antenna array according to a modification. More specifically, FIG. 11 illustrates two antenna elements 10Aa and 10b that are included in a plurality of antenna elements 10, which are included in the antenna array, and that are adjacent to each other in the X-axis direction.

The difference between the antenna element 10Aa and the above-described antenna element 10a is that, in the antenna element 10Aa, the transmission feeding point Txa is positioned so as to be offset from the center Pa in the positive X-axis direction, and the reception feeding point Rxa is positioned so as to be offset from the center Pa in the negative Y-axis direction. Thus, in this configuration, when the dielectric substrate 14 is viewed in plan view, the position of the transmission feeding point Txa in the radiation conductor 11a and the position of the reception feeding point Rxb in the radiation conductor 11b do not match each other, and the position of the reception feeding point Rxa in the radiation conductor 11a and the position of the transmission feeding point Txb in the radiation conductor 11b also do not match each other.

Also, in such an antenna array, which is configured as described above, in the radiation conductor 11a, the transmission feeding point Txa is set at a position where an electric field oriented in the X-axis direction is excited, and the reception feeding point Rxa is set at a position where an electric field oriented in the Y-axis direction is excited, so that advantageous effects similar to those of the above-described antenna array are obtained. In other words, the isolation between the radiation conductor 11a and the radiation conductor 11b can be improved both at the time of transmission and reception, and thus, the improvement of the communication quality is achieved.

In addition, in the above description, two types of polarized waves (polarized waves in the X-axis direction and polarized waves in the Y-axis direction in the above description) that are formed by two transmission feeding points of two of the radiation conductors 11 that are adjacent to each other are the same as two types of polarized waves (polarized waves in the X-axis direction and polarized waves in the Y-axis direction in the above description) that are formed by two reception feeding points of these two radiation conductors 11. However, at least one of the two types of polarized waves formed by the above-mentioned two transmission feeding points and at least one of the two types of polarized waves formed by the above-mentioned two reception feeding points may be different from each other. For example, two types of polarized waves, which are polarized waves in the X-axis direction and polarized waves in the Y-axis direction may be formed by the above-mentioned two transmission feeding points, and polarized waves in two directions each of which is perpendicular to the Z-axis direction and each of which is different from the X-axis direction and the Y-axis direction, the two directions being orthogonal to each other, may be formed by the above-mentioned two reception feeding points.

Even in such an antenna module, which is configured as described above, advantageous effects similar to those of the above-described antenna module 1 are obtained. In other words, in two of the radiation conductors 11 that are adjacent to each other, polarized waves that are formed by the transmission feeding point in one of the two radiation conductors 11 are different from polarized waves that are formed by the transmission feeding point in the other of the two radiation conductors 11, and polarized waves that are formed by the reception feeding point in the one radiation conductor 11 are different from polarized waves that are formed by the reception feeding point in the other radiation conductor 11, so that the improvement of the communication quality is achieved.

The above-described configuration can be applied to, for example, an antenna module that performs communication by using millimeter waves in a frequency band of 28 GHz, 39 GHz, or 60 GHz and a communication device that includes this antenna module. Note that the above-described configuration may be applied to an antenna module that performs communication by using radio waves in a frequency band other than the above-mentioned frequency bands and a communication device that includes this antenna module.

In addition, the antenna elements included in the antenna array may include a plurality of radiation conductors capable of using a plurality of frequency bands that are different from one another.

In addition, the above-described configuration may correspond to, for example, an antenna array that is formed by integrating a transmission antenna array including radiating elements that are arranged in a direction inclined at an angle of +45 degrees with respect to the X-axis coordinate (or the Y-axis coordinate) and a reception antenna array including radiating elements that are arranged in a direction inclined at an angle of −45 degrees with respect to the X-axis coordinate (or the Y-axis coordinate) when viewed in a direction perpendicular to an XY plane (i.e., when the dielectric substrate 14 is viewed in plan view).

Each of the radiation conductors may have two transmission feeding points that are supplied with electrical power with opposite phases and that are symmetrically arranged with respect to the center line of the radiation conductor (e.g., the axis Ay1 or the axis Ay2 in FIGS. 3A and 3B) when the dielectric substrate 14 is viewed in plan view. In addition, each of the radiation conductors may have two reception feeding points that are supplied with electrical power with opposite phases and that are symmetrically arranged with respect to the center line of the radiation conductor (e.g., the axis Ax1 in FIGS. 3A and 3B) when the dielectric substrate 14 is viewed in plan view. As a result, degradation of cross-polarization discrimination (XPD) due to the influence of polarized waves that are generated by a feeding via conductor and that propagate in the thickness direction of the dielectric substrate 14 can be suppressed.

The antenna module according to the above-described embodiment can also be applied to, for example, a massive MIMO system. One of promising wireless transmission technologies in the fifth-generation mobile communications system (5G) is a combination of a phantom cell technology and the massive MIMO system. A phantom cell is a network configuration in which control signals used for ensuring communication stability between a macro cell in a lower frequency band and a small cell in a higher frequency band and data signals that are targets of high-speed data communication are separated from each other. A massive MIMO antenna device is provided in each phantom cell. The massive MIMO system is a technology for improving transmission quality in a millimeter-wave band or the like and controls the directivity of an antenna by controlling signals transmitted from the radiation conductors 11. In addition, the massive MIMO system uses a large number of radiation conductors 11, and thus, a beam having a sharp directivity can be generated. Radio waves can be emitted over a reasonably long distance even in a high-frequency band by increasing the directivity of a beam, and frequency utilization efficiency can be improved by reducing interference between cells.

The present disclosure can be widely used as an antenna module having a high communication quality in communication devices and so forth that perform full-duplex communication.

1 antenna module
  2 BBIC
  5 communication device
  10, 10a, 10b, 10c, 10d, 10Aa antenna element
  11, 11a, 11b, 11c, 11d radiation conductor
  12a, 12b, 12c, 12d, 13a, 13b, 13c, 13d via conductor
  14 dielectric substrate
  20 RFIC
  21C cancel circuit
  22AT to 22DT POWER AMPLIFIER
  22AR to 22DR low-noise amplifier
  23A to 23D, 27 switch
  24A to 24D, 24AT to 24DT, 24AR to 24DR attenuator
  25A to 25D, 25AT to 25DT, 25AR to 25DR phase shifter
  26, 26T, 26R signal synthesizer/duplexer
  28 mixer
  29 amplifier circuit
  100 antenna array
  141 substrate body
  142 wiring pattern conductor
  143a, 143b ground pattern conductor
  Rxa, Rxb, Rxc, Rxd reception feeding point
  Txa, Txb, Txc, Txd transmission feeding point

The invention claimed is:

1. An antenna module comprising:
a patch antenna array comprising a plurality of radiation conductors in or on a dielectric substrate, the plurality of radiation conductors being arranged at regular intervals; and
a radio frequency (RF) signal processing circuit that is disposed in or on the dielectric substrate and that is configured to process a transmission signal for transmission by the patch antenna array or a reception signal received by the patch antenna array,
wherein each of the plurality of radiation conductors has a transmission feeding point from which the transmission signal is transmitted to the RF signal processing circuit and a reception feeding point at which the reception signal is received from the RF signal processing circuit,
wherein polarized waves formed by the transmission feeding point of a first of the plurality of radiation conductors are different from polarized waves formed by the transmission feeding point of a second of the plurality of radiation conductors, the second radiation conductor being adjacent to the first radiation conductor, and
wherein polarized waves formed by the reception feeding point of the first radiation conductor are different from polarized waves formed by the reception feeding point of the second radiation conductor.

2. The antenna module according to claim 1,
wherein the transmission feeding point of the first radiation conductor is at a position that causes an electric field of polarized waves in a first direction to become excited, and the reception feeding point of the first radiation conductor is at a position that causes an electric field of polarized waves in a second direction to become excited, and
wherein the transmission feeding point of the second radiation conductor is at a position that causes an electric field of polarized waves in the second direction to become excited, and the reception feeding point of the second radiation conductor is at a position that causes an electric field of polarized waves in the first direction to become excited.

3. The antenna module according to claim 2,
wherein the plurality of radiation conductors have substantially the same shape and size, and
wherein, when the dielectric substrate portion of each of the first and second radiation conductors is viewed in a plan view, the position of the transmission feeding point of the first radiation conductor and the position of the reception feeding point of the second radiation conductor substantially match each other, and the position of the reception feeding point of the first radiation conductor and the position of the transmission feeding point of the second radiation conductor substantially match each other.

4. The antenna module according to claim 2,
wherein the first radiation conductor and the second radiation conductor are arranged adjacent to each other in the first direction or the second direction,
wherein, when the dielectric substrate is viewed in plan view, the transmission feeding point of the first radiation conductor is offset from the center of the first radiation conductor in the first direction, and the reception feeding point of the first radiation conductor is offset from the center of the first radiation conductor in the second direction, and
wherein, when the dielectric substrate is viewed in plan view, the transmission feeding point of the second radiation conductor is offset from the center of the second radiation conductor in the second direction, and the reception feeding point of the second radiation conductor is offset from the center of the second radiation conductor in the first direction.

5. The antenna module according to claim 2, wherein the first direction and the second direction are perpendicular to each other.

6. The antenna module according to claim 5,
wherein the plurality of radiation conductors further comprise a third radiation conductor and a fourth radiation conductor that are adjacent to the first radiation conductor and the second radiation conductor,
wherein the first radiation conductor and the second radiation conductor are adjacent to each other in the same direction as the third radiation conductor and the fourth radiation conductor are adjacent to each other,
wherein the first radiation conductor and the third radiation conductor are adjacent to each other in the same direction as the second radiation conductor and the fourth radiation conductor are adjacent to each other, such that the first, second, third, and fourth radiation conductors form a 2×2 array of radiation conductors,
wherein the transmission feeding point of the third radiation conductor is at a position that causes an electric field of polarized waves in the second direction to become excited, and the reception feeding point of the third radiation conductor is at a position that causes an electric field of polarized waves in the first direction to become excited, and
wherein the transmission feeding point of the fourth radiation conductor is at a position that causes an electric field of polarized waves in the first direction to become excited, and the reception feeding point of the fourth radiation conductor is at a position that causes an electric field of polarized waves in the second direction to become excited.

7. The antenna module according to claim 6,
wherein the plurality of radiation conductors have substantially the same shape and size, and
wherein, when the dielectric substrate portion of each of the first and third radiation conductors is viewed in a plan view, the position of the transmission feeding point of the first radiation conductor and the position of the reception feeding point of the third radiation conductor substantially match each other, and the position of the reception feeding point of the first radiation conductor and the position of the transmission feeding point of the third radiation conductor substantially match each other.

8. The antenna module according to claim 6,
wherein the plurality of radiation conductors have substantially the same shape and size, and
wherein, when the dielectric substrate portion of each of the first and fourth radiation conductors is viewed in a plan view, the position of the transmission feeding point of the first radiation conductor and the position of the transmission feeding point of the fourth radiation conductor substantially match each other, and the position of the reception feeding point of the first radiation conductor and the position of the reception feeding point of the fourth radiation conductor substantially match each other.

9. The antenna module according to claim 5, wherein, for the plurality of radiation conductors, an arrangement of the transmission feeding points and the reception feeding points is repeated every two radiation conductors in the first direction and the second direction.

10. The antenna module according to claim 1, wherein the patch antenna array is configured transmit the transmission signal and to receive the reception signal at different times.

11. The antenna module according to claim 1, wherein the patch antenna array is configured to transmit the transmission signal and to receive the reception signal simultaneously.

12. The antenna module according to claim 11, wherein the transmission signal and the reception signal have different frequency bands.

13. The antenna module according to claim 1, wherein, when the dielectric substrate is viewed in a plan view, the RF signal processing circuit is disposed so as to overlap the patch antenna array.

14. A communication device comprising:
the antenna module according to claim 1; and
a baseband signal processing circuit,
wherein the RF signal processing circuit is configured to:
perform signal processing of a transmission system that up-converts a signal input from the baseband signal processing circuit, and to output the transmission signal to the patch antenna array; and
to perform signal processing of a reception system that down-converts the reception signal input from the patch antenna array, and to output the reception signal to the baseband signal processing circuit.

* * * * *